United States Patent
Kathan et al.

[19]

[11] Patent Number: 5,892,156

[45] Date of Patent: Apr. 6, 1999

[54] PRESSURE MEASURING SENSOR AND APPARATUS HAVING A SEAL BETWEEN A HOUSING HAVING SPRING-ELASTIC PROPERTIES AND A PRESSURE MEASURING CELL

[75] Inventors: Benno Kathan; Jörg Schutze, both of Wasserburg, Germany

[73] Assignee: IFM Electronic GmbH, Tettnang, Germany

[21] Appl. No.: 12,732

[22] Filed: Jan. 23, 1998

Related U.S. Application Data

[62] Division of Ser. No. 691,590, Aug. 2, 1996, Pat. No. 5,824,909.

[30] Foreign Application Priority Data

Aug. 4, 1995 [DE] Germany .......... 195 26 852.9
Jul. 16, 1996 [DE] Germany .......... 196 28 551.8

[51] Int. Cl.$^6$ .......... G01L 7/00
[52] U.S. Cl. .......... 73/706
[58] Field of Search .......... 73/706, 715, 723, 73/4 R, 756

[56] References Cited

U.S. PATENT DOCUMENTS

| 4,109,535 | 8/1978 | Reed et al. .......... 73/706 |
| 4,970,898 | 11/1990 | Walish et al. .......... 73/706 |
| 5,094,109 | 3/1992 | Dean et al. .......... 73/706 |
| 5,329,819 | 7/1994 | Park et al. .......... 73/706 |

FOREIGN PATENT DOCUMENTS

| 2929624 | 3/1981 | Germany . |
| 4018638 | 12/1991 | Germany . |
| 4234289 | 11/1993 | Germany . |
| 4234290 | 4/1994 | Germany . |
| 4407212 | 8/1995 | Germany . |
| 4416978 | 11/1995 | Germany . |

OTHER PUBLICATIONS

German Office Action for German Application No. 196 28 551.8–52 (in German and English). No date.

Drewes et al. "Kapazitiver Keramischer Drucksensor Hoher Stabilitat Für die Prozemeβtechnik", *ITG Fachbericht 126: Sensoren–Technologie und Anwendung*, pp. 387–392, 1994. No month.

"Totraumfreie Instrumentierung– Inline–Kontroll– und Meβtecnik", Flüssiges Obst. Feb. 1992.

Hellwig, "Übersicht Über Verschiedene Aufnehmerprinzipien für Elektrische Druckmessung", Jun. 1986.

"Druckmeβumformer für Spezielle Anwendungen", WIKA Product Brochure, Mar. 1995.

"O–Ring" Busak+Shamban Catalog, 1993. No month.

*Primary Examiner*—William Oen
*Attorney, Agent, or Firm*—Greenblum & Bernstein, P.L.C.

[57] ABSTRACT

Pressure or force measurement device for static or dynamic pressure measurement, in particular for high pressures or forces, having a housing including a pressure or force measuring cell, e.g., a piezoresistive or capacitive measuring cell. In such devices, service life and chemical resistance are problematic. The pressure measurement device includes the housing, a seal between the pressure medium and an inner chamber of the housing, a pressure measuring cell having a main face exposed to the pressure medium and which pressure measuring cell having a deflection when pressure loaded, which deflection leads to a relative movement between the pressure measuring cell and the housing in a region of the seal. In a region of the seal, the housing has spring-elastic properties. The pressure measurement device further includes a flange with an elastic sealing rib forming a through opening. The housing may be rotationally symmetrical with respect to the flange.

31 Claims, 4 Drawing Sheets

PRESSURE MEASURING SENSOR AND APPARATUS HAVING A SEAL BETWEEN A HOUSING HAVING SPRING-ELASTIC PROPERTIES AND A PRESSURE MEASURING CELL

CROSS REFERENCE TO RELATED APPLICATIONS

This application is a divisional of application Ser. No. 08/691,590, filed Aug. 2, 1996, now U.S. Pat. No. 5,824, 969. The entire disclosure of application Ser. No. 08/691, 590 is considered as being part of the disclosure of this application, and the entire disclosure of application Ser. No. 08/691,590 is expressly incorporated by reference herein in its entirety.

The present application claims priority, under 35 U.S.C. §119, of German Patent Application No. 195 28652.9-52, filed Aug. 4, 1995, and German Patent Application No. 196 28 551.8, filed Jul. 16, 1996.

BACKGROUND OF THE INVENTION

1. Field of the Invention

The invention relates to pressure measurement apparatuses and pressure and/or force measurement devices, in particular for high pressures or forces, whose housing contains among other things, a pressure or force measuring cell, e.g. a piezoresistive or capacitive measuring cell. A capacitive pressure measuring cell is essentially comprised of a base body (e.g. ceramic) and a membrane (e.g. ceramic) connected to it and electrodes, whose spacing change due to membrane deflection achieves a capacitance change. A seal between the measurement device housing and the pressure measuring cell prevents the penetration of pressure medium into the inner chamber of the housing.

2. Discussion of Background Information

Rubber elastic O-rings made of elastomers are used for seals of this kind, e.g. if the pressure measuring cell is comprised of a non-metallic material (e.g. ceramic) and the housing is comprised of metallic material (e.g. V4A).

An example of this is capacitive pressure measurement devices of the Cerabar Series of the PMC731-R12S1E19Y4 type from the Company Endress & Hauser GmbH (pressure measurement range 0–40 bar, cylindrical ceramic pressure measuring cell). Like all other known pressure measurement devices with non-metallic membrane or pressure measuring cell, they have a high housing stability in the region of the pressure measuring cell and the elastomer seal, because of the housing thickness of several millimeters. Because of the positive corrosion resistance of the ceramic membrane, separating membranes and pressure averagers are actually not necessary. The rubber elastic seals, however, are susceptible to wear. As a result, therefore, waved stainless steel membranes are frequently used.

The above mentioned Endress & Hauser pressure measurement device is embodied as flush in front, i.e. the membrane surface toward the medium is disposed very near to the housing end, while in pressure measurement devices which are not flush in front, the pressure medium travels via a more or less long conduit of the solid housing, reaching the pressure measuring cell (e.g. see German Patent Application P 44 16 978.7, FIG. 1, and the reference "Kapazitiver keramischer Drucksensor hoher Stabilität für die Prozessmesstechnik" [High Stability Capacitive Ceramic Pressure Sensors for Process Measuring Technology], by Drewes, Friedrich, Hegner, Klahn and Schmidt).

In flush front pressure measurement devices, a smaller dead space can be achieved, which is important for use of pressure measurement devices in food, chemical, pharmaceutical, and paper manufacturing. A small dead space means few gaps and hollow spaces, which in the event of a medium change, could lead to difficulties in the removal of the old medium (e.g. see the pamphlet "Totraumfreie Instrumentierung—Inline-Kontroll- und Messtechnik" [Dead Space-free Instrumentation—In-line Control and Measurement Technology] from the Tuchenhagen company).

These kinds of apparatuses made up of pressure measuring cell, housing, and O-ring are not without problems as regards tightness or service life of the O-ring, even at average pressures (20–40 bar). This has been disclosed, for example, in the reference "Übersicht uber verschiedene Aufnehmerprinzipien für die elektrische Druckmessung" [Overview of Various Sensor Principles for Electrical Pressure Measurement] by R. Hellwig, p. 2.5, section 2.3.2. Since as a rule, no static continuous loading and continuous deforming occurs, but a dynamic loading, which, due to the movement and deforming of the O-ring, can lead to frequent exceeding of strength and stretchability limits and consequently to the destruction of the O-ring. When there is constantly repeating deforming, the material is damaged as a result of internal friction, by means of which first small tears occur, which can grow and eventually lead to breakage.

O-rings for sealing purposes are generally made of widely varying materials. Primarily, elastomers are used (e.g. acrylonitrile-butadiene rubber and acrylate rubber). Sealing elements of thermoplastic materials differ according to the base materials used. In many instances, they can be varied by introducing particular additives and can thus be purposefully matched to employment purpose of the part to be manufactured.

Elastomers are wide-meshed, temperature stable, cross-linked polymers which do not become liquid from a low 20° C. up to the temperature region of chemical decomposition, but can be reversibly deformed in a rubber elastic manner, in a manner that is to a large extent independent of temperature.

A body is elastic if, after a forced deforming, it re-assumes its original shape relatively rapidly (e.g. a metal spring). A body which maintains its deformation is plastic or viscous (e.g. kneaded rubber). A viscoelastic body is both at the same time. It is characteristic of viscoelastic behavior that when springing back, the original state is reached not immediately after release, but only gradually, depending upon the conditions.

This property is characteristic of rubber elastic O-ring seals. Just like deformability, elasticity is dependent upon temperature and primarily upon the chronological course of the deformation process. Temperature load, temperature change load, pressure load, and pressure change load decisively determine the service life of rubber elastic O-rings.

As described above, their use for sealing pressure measuring cells and housings is already problematic at average pressures if relative movements of the parts to be sealed occur (membrane/pressure measuring cell and housing). This kind of relative movements can be caused by temperature change in combination with differing thermal expansion coefficients of the parts to be sealed and by pressure changes which lead to undesirable movements (axial and radial) of the membrane surface or pressure measuring cell surface in its edge region, (e.g. in the region of the seal, see German Patent Application P 44 16 978.7). This movement is the greatest at the membrane edge and is particularly critical in the case of capacitive pressure measurement devices without pressure averagers, which devices have a relatively thick ceramic membrane. The magnitude of this movement is a function of the pressure, the membrane diameter, the inner diameter of the spacer, the thickness of the pressure measuring cell (even the base body, which is quite stable, has a deflection), as well as the mechanical properties of the membrane, spacer, and base body. Especially when employed in the food industry, the use of relatively soft rubber elastic O-ring seals is problematic due to the high temperature shock load. In principle, harder seals can in fact also be used, which as a rule also have a better chemical resistance, but then, a stronger O-ring must be used, which impairs frontal flushness (larger dead space) and constitutes a larger abrasion surface for abrasive mediums.

The durable tightness is important not only between the pressure measuring cell and the housing of the pressure measurement device, but also between the flange and the pressure measurement device. A flange from the WIKA company is known for the flush front screw connection of a low pressure measurement device. The flange and pressure measurement device have a metallic sealing cone. The thickness of the conical sealing part is 5 mm. This embodiment is disadvantageous in that it can be problematic with regard to tightness at higher pressures. It is also disadvantageous that the force with which the pressure measurement device presses against the conical part of the flange when screwed in can vary widely. If the force is too great, this can negatively influence the characteristic curve or the operability of the pressure measurement device.

SUMMARY OF THE INVENTION

Therefore, the object of the invention is to avoid the above-mentioned disadvantages, in particular to solve sealing problems in the flange/pressure measurement device region or the pressure measuring cell/housing region, and to disclose a pressure measurement device or pressure measurement apparatus that is particularly suited for flush front installation. Furthermore, a durable tightness should be achieved in the event of high pressures or frequent pressure or temperature changes.

According to the invention, in a pressure measurement device for static or dynamic pressure measurement, which is essentially comprised of a housing, a seal between the pressure medium and the inner chamber of the housing, a pressure measuring cell, whose first main face is exposed to the pressure medium and which has a deflection when pressure loaded, which deflection leads to a relative movement between pressure measuring cell and housing in the region of the seal, according to a first variant, the object is attained by virtue of the fact that in the region of the seal, the housing is embodied so that it has spring-elastic properties.

It has also been recognized that it is not absolutely required to embody the housing in the region of the pressure measuring cell and seal as very stable in accordance with the maximum permissible pressure. On the contrary, since the housing thickness in this region is drastically reduced and embodied so that it has definite spring-elastic properties, it can assume or partially assume a function which was previously reserved for the O-ring seal, namely the adaptation to changes of the cross section of the sealing gap (spacing between the pressure measuring cell/housing). In addition, the maximum deformation gradient of the O-ring seal is reduced (both in the event of dynamic pressure load and in the event of static pressure load due to rapid temperature change with varying thermal expansion coefficients of the pressure measuring cell and housing; in both cases, the O-ring is dynamically loaded, i.e. a relative movement occurs between the sealing means (O-ring) and the contact faces of the parts to be sealed). In this manner, the service life of the rubber elastic seal can be increased. This is particularly true at high pressures.

A further advantage is produced with regard to the characteristic curve of the pressure measurement device, which curve can be improved by a suitable, spring-elastic embodiment of the end face part of the housing.

As a result of the spring-elastic embodiment of the end face part of the housing, it is also possible to use harder, rubber elastic seals which as a rule also have a longer service life and a better chemical resistance. In addition, the cross sectional face of the seal can be reduced. This is favorable with regard to abrasive mediums (in combination with a particularly resistant ceramic membrane) and additionally leads to a reduced dead space, which is important in devices that are flush in front.

The invention can be used to particular advantage if there are high pressures or high pressure change speeds, if the thermal expansion coefficients of the parts to be sealed (membrane/pressure measuring cell, housing) are different and the membrane is embodied as one part (e.g. ceramic membrane of a capacitive pressure measuring cell with a rectangular cross section).

In this kind of embodiment of the pressure measurement device, it can also be possible and advantageous to use a rubber elastic seal with a rectangular or almost rectangular cross section, which can be coated, for example, with PTFE in order to increase chemical resistance to aggressive mediums. Naturally, PTFE-coated O-ring seals can also be used.

As a result of the embodiment according to the invention, it is even possible to use exclusively non-elastic or slightly elastic material for the seal, e.g. thermoplastics, to which materials like PTFE, ethylene tetrafluoroethylene copolymer (ETFE), and perfluoroalkoxy copolymer (PFA) belong, which are particularly chemically resistant. By means of this, trouble-free, durable seals can be achieved at up to 200 bar and higher. It is also no longer necessary to match the seal material to the medium, as is required in known pressure measurement device with rubber elastic O-rings. By means of this, the number of different device types can be reduced (more effective storage) or the construction of the device can be simplified because with the use of this kind of chemically resistant material, the seal is not required to be replaceable in most instances.

This embodiment is particularly suited for the food industry because it has a low sensitivity to temperature shock and a high chemical resistance. In addition, smaller seal cross sections can be achieved than with rubber elastic seals and consequently an improved resistance to abrasive mediums as well as an improved frontal flushness (smaller dead space, lesser resistance to flow).

Because of the reduced housing cross section in the region of the seal, an improved frontal flushness (smaller dead space, lesser resistance to flow) can likewise be achieved.

In the region of the main face (membrane) of the pressure measuring cell, which face is oriented toward the pressure medium, the housing advantageously has an elastic sealing rib with a groove for receiving the seal. The elastic sealing rib nose on the end of the elastic sealing rib is of particular significance when thermoplastic seals with cold flow properties (e.g. PTFE) are used. The height and the embodiment of the elastic sealing rib nose can be matched to the seal material so that a cold flow occurs in a particular manner and in this way, a pressure measurement device with a small dead space can be produced which is particularly suited for the food industry. The spacing between the elastic sealing rib and the membrane on the other side of the seal is selected so that it is minimal in the event of corresponding initial stress of the elastic sealing rib.

In principle, it is also possible, though, to attach the seal to the outside (lateral face) of the pressure measuring cell. This can take place for example in the manner in which the seal connects to the membrane surface in a flush manner. The elastic sealing rib is likewise disposed in the region of the lateral face. The elastic sealing rib and/or the outside of the membrane can have a groove in order to prevent the seal or pressure measuring cell from slipping out or to make this more difficult. The edge of the membrane can also be beveled and the seal can be embodied as L-shaped so that it contacts the lateral face and the bevel. The elastic sealing rib nose rests against the end face of the seal. The seal can also be embodied as L-shaped (with or without a bevel) and can reach around to the main face of the membrane (see exemplary embodiments).

Optimum properties of the pressure measurement device can be achieved if the housing and pressure measuring cell have a rotationally symmetrical shape. The pressure measuring cell does not have to be embodied as two parts as in capacitive pressure measuring cells (membrane and base body, which are connected via a spacer), a one-piece embodiment (membrane) is also possible, as in piezoresistive pressure measuring cells.

A second variant of the invention relates to a pressure measurement apparatus, which is comprised of a flange with a conical sealing rib in the through opening of the flange and a pressure measurement device with a housing that is rotationally symmetrical in the region of the flange. According to the invention, the sealing rib is embodied as an elastic sealing rib. The spring-elastic sealing rib permits a secure seal, in particular at high pressures, e.g. 50–500 bar. In order to achieve this, the sealing bevel has an angle of 15°–35° in relation to the longitudinal axis of the flange. In the disconnected state, the angle of the sealing bevel of the pressure measurement device housing is 0.75–8 degrees greater than the angle of the sealing bevel of the sealing rib. When the housing and flange are connected, the sealing bevels are therefore not disposed parallel to each other as in the known embodiment, but at an acute angle. Therefore, no wide contact face is produced, but only a contact line or a narrow contact face, which produces a favorable sealing effect. It is advantageous if the sealing rib tapers in the direction of the sealing bevel.

In order to limit the maximum value of the force acting on the sealing bevels, the pressure measurement device housing has a protrusion which defines the installation depth of the pressure measurement device. This prevents deformations or damage to the pressure measurement device (or to the pressure measuring cell) in the region of the sealing bevel, which deformations or damage can lead to measurement errors or can cause the pressure measurement device to completely fall out. The negative effects of differing thermal expansion coefficients can also be compensated for in a large temperature range by the combined effect of installation depth limiting and the spring-elastic sealing rib. In order to produce an optimum sealing effect, at least the two sealing bevels are comprised of the same material, preferably the entire flange and the pressure measurement device housing in the region of the flange are comprised of the same material, e.g. stainless steel. The average peak-to-valley height of the sealing bevels according to Norm DIN 4768 should be a maximum of 1.2 $\mu$m.

For applications in the food industry and the chemical industry, it is advantageous if the pressure measurement device housing is positioned as frontally flush with regard to the flange and the sealing rib of the flange constitutes a part of the frontally flush region. Hollow spaces and gaps, which make cleaning difficult, are consequently avoided.

Preferably, for the second variant of the invention, a pressure measurement device is used which corresponds to the first variant of the invention.

The invention is also suited for the production of pressure measurement devices and pressure measurement apparatuses which are not flush in front.

BRIEF DESCRIPTION OF THE DRAWING FIGURES

A number of exemplary embodiments of the invention are explained in conjunction with FIGS. 1 to 6.

FIG. 1 is a longitudinal sectional representation of a first exemplary embodiment of a part of a flush front pressure measurement device according to the invention FIG. 2 is a longitudinal sectional representation of a second exemplary embodiment of a part of a flush front pressure measurement device according to the invention FIG. 3 is a longitudinal sectional representation of a known flange FIG. 4 is a longitudinal sectional representation of detail Z of FIG. 5.

DETAILED DESCRIPTION OF THE PREFERRED EMBODIMENT

Figure 1:
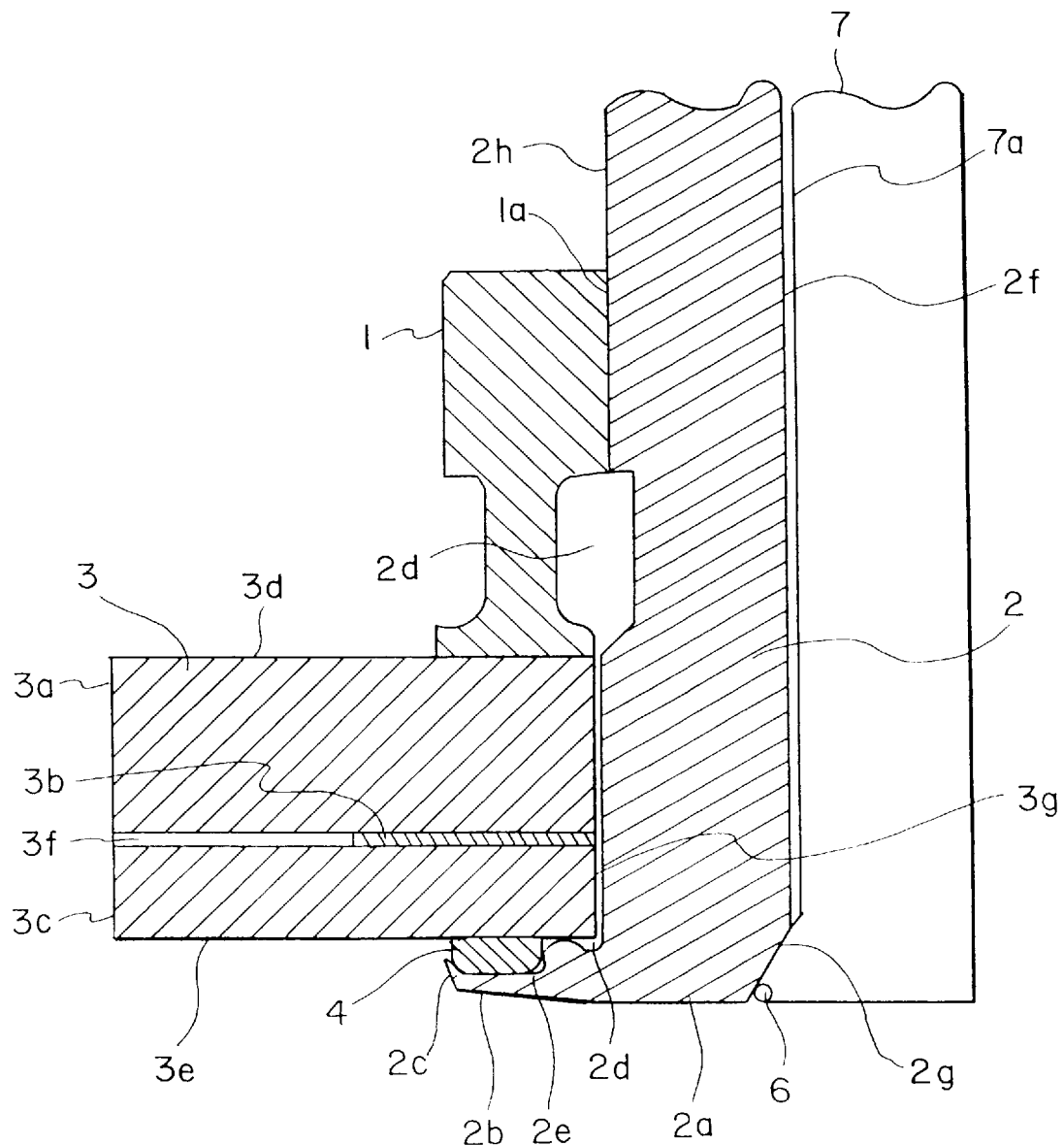

FIG. 1 shows the structure of a part of a pressure measurement device according to the invention in the region of the seal 4, which has an approximately rectangular cross section and a beveled edge and is disposed in the edge region of the first main face 3e of the capacitive, rotationally symmetrical pressure measuring cell 3. The end face part 2a of the rotationally symmetrical metallic housing 2 is embodied as elastically resilient in the region of the elastic sealing rib 2b. If a rubber elastic seal 4 is used, the maximum deformation gradient is reduced by means of this, and thus its service life is increased. If a ceramic, capacitive measuring cell 3 is used, which has a membrane (3c) embodied as one piece and a metallic housing 2 (e.g. V4A), then the difference between the thermal expansion coefficients is particularly large. In instances of this kind, the advantage of the invention turns out to be particularly useful because in the event of a temperature change, a large relative movement of the pressure measuring cell 3 and housing 2 occurs, particularly in the region of the membrane edge. This relative movement puts stress on the rubber elastic seal, particularly at low and high temperatures.

A large relative movement also occurs at high pressures or in the event of a change from a low to a high pressure and vice versa. For this reason, it can be advantageous to use a coated O-ring or rectangular ring for the seal 4. This coating can increase resistance to chemically aggressive mediums. A suitable material for this, for example, is polytetrafluoroethylene (PTFE), which has a very low static friction.

As a result of the structural embodiment of the end face 2a of the housing 2, though, it is also possible to use a non-elastic seal 4 that is rectangular or shaped like an O-ring, e.g. a thermoplastic, instead of the rubber elastic seals commonly used for this kind of seal. Pure PTFE is particularly suited for this because of its cold flow properties for minimizing dead space 5 (see FIG. 2) and because of its particularly favorable chemical resistance. It is also possible to use more or less elastic thermoplastic. PTFE seals 4 with rectangular cross sections have favorable sealing properties, are quite cheap to make, and are considerably cheaper than PTFE coated O-rings with an elastomer core. Instead of PTFE, ethylene tetrafluoroethylene copolymers or perfluoroalkoxyl copolymers (PFA) can also be used, however their chemical resistance does not completely reach that of PTFE.

Preferably the pressure measurement device is constructed so that the force with which the elastic sealing rib 2b is pressed against the seal 4 can be adjusted. By means of this, an optimal adaptation to various parameters such as properties of the seal and the elastic sealing rib, type of pressure measuring cell, maximum pressure, operating temperature range, etc. is possible. The force adjustment can take place, for example, via the support ring 1, which is joined (e.g. via a thread 1a, not shown) in a frictional, non-positive manner to the housing 2 and its internal thread 2h, not shown, (see German Patent Application P 44 16 978.7). If a capacitive pressure measuring cell 3 is used, which has a membrane 3c, spacer 3b, (e.g. a glass solder), base body 3a, and electrodes, not shown, disposed in the inner chamber 3f, then the inner diameter of the seal 4 should be chosen so that it is not smaller than the inner diameter of the spacer 3b so that the seal 4 does not influence the characteristic curve of the pressure measuring cell 3.

Embodying the end face part 2a of the housing 2 as two parts is suggested in order to reduce technical manufacturing problems in the production of the housing 2. This could take place for example in such a way that the part of the housing 2 which comes in contact with the medium is made up of an elastic annular disk which also includes the elastic sealing rib 2b with groove 2e. The elastic annular disk can be connected to the actual housing by means of adhesion.

The pressure measurement device can have an external thread 2f, not shown, and a sealing bevel 2g and can be screwed into a flange 7. The seal is carried out via a seal 6 that can be a rubber elastic O-ring, for example. A non-elastic PTFE ring with a rectangular cross section could also be used in the case of a corresponding embodiment of the sealing bevel 2g and flange 7. The seal, though, is not critical since the thermal expansion coefficients of the housing 2 and flange 7 (e.g. V4A) are the same or almost the same (metallic materials).

Here, the user has the possibility of using seals particularly matched to the medium because these are usually standard connections.

The housing 2 and flange 7 are embodied so that the dead space in the region of the seal 6 is minimal.

For example, a 400-bar pressure measurement device according to the invention could have the following characteristics: diameter of the capacitive ceramic pressure measuring cell 3: 21 mm, membrane thickness 2.5 mm, maximum deflection of the membrane 3c: 10 μm, inner diameter of the PTFE seal 4: 15 mm, outer diameter: 20 mm, thickness: 0.8 mm, minimum and maximum thickness of the V4A elastic sealing rib 2b in the region of the groove bottom: 0.3 mm and 1 mm, height of the elastic sealing rib nose 0.15 mm, maximum and minimum spacing of the groove bottom from the underside of the seal 4 without initial stress by means of the support ring 1: 0.07 mm and 0 mm (in the region of the elastic sealing rib nose 2c), a force exerted on the sealing ring by support ring 1, which is independent of pressure, e.g., due to coupling forces: approx. 1500N, and a force exerted on the sealing ring, which is dependent on pressure in a linear relationship, e.g., at 200 bar: approx. 2700N; at 400 bar: approx. 5400N. Thus, in total, e.g., the 400 bar pressure measurement device may exert a force of 1500N+5400N, or 6900N, on the sealing ring.

In a further example, a 400 bar pressure measuring device may comprise: a diameter of the capacitive ceramic measuring cell 3 of approximately 21.4 mm; a membrane thickness of approximately 2.5 mm; a maximum bending of membrane 3c of approximately 10 μm; an inner diameter of PTFE seal 4 of approximately 15.4 mm; an outer diameter of PTFE seal 4 of approximately 20.0 mm; a thickness of PTFE seal 4 of approximately 0.5 mm; a minimum and maximum thickness of V4A elastic sealing rib 2b, during maximum load, of approximately 0.25 mm and 0.65 mm, respectively; a height of the seal, during maximum load, of approximately 0.35 mm; a minimum and maximum distance between V4A elastic sealing rib 2b and a bottom of sealing ring 4, during maximum load and without tension due to support ring 1, of approximately 0 mm and 0.08 mm, respectively; a force exerted on the sealing ring by 400 bar of approximately 5400N; and an additional force (independent of pressure) exerted on the sealing ring by support ring 1 of approximately 1400N.

Figure 2:
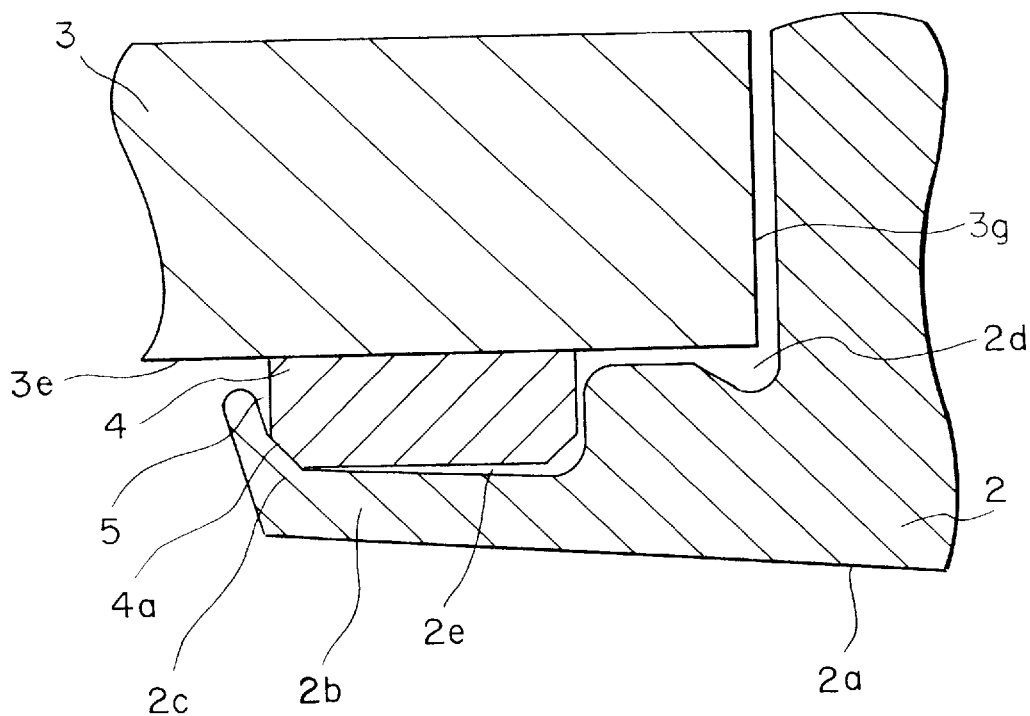

FIG. 2 shows a greatly enlarged longitudinal section, not to scale, of a part of a flush front pressure measurement device according to the invention, in the region of the seal 4.

Here, the dead space is quite small because of a corresponding embodiment of the elastic sealing rib nose 2c and the beveled edge 4a of the PTFE seal 4 on the end toward the medium. Because of the cold flow properties of the pure PTFE and because of the intense force exertion of the elastic sealing rib 2b on the seal 4 in the event of initial stress by the support ring 1, with the corresponding embodiment of the elastic sealing rib nose 3c as a function of the cold flow properties of the seal 4, even in the presence of medium pressure, the dead space 5 is filled and consequently reduced by means of the swelling out (cold flow) of the PTFE.

This property is achieved not only by means of the shape of the elastic sealing rib nose 3c, but also by means of the embodiment of the seal 4 and the groove 2e. Here, the seal 4 has a constant thickness, the groove depth is at its least in the region of the edge 4a toward the medium.

In the event of a corresponding initial stress of the elastic sealing rib 2b, this contacts the underside of the seal 4 almost completely. This embodiment permits the achievement of optimal sealing properties and minimal dead space 5.

Alternatively, it is also possible to allow the groove bottom to run parallel to the first main face 3e of the pressure measuring cell 3 and to vary the thickness of the seal 4 so that it is at its greatest in the region of the edge toward the medium. A combination of these two possibilities is also conceivable.

Figure 4:
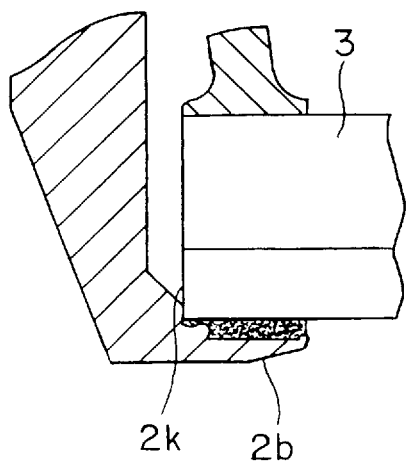

In a 2:1 scale, FIG. 4 shows another exemplary embodiment for an elastic sealing rib according to the invention with the pressure measuring cell and seal.

Figure 3:
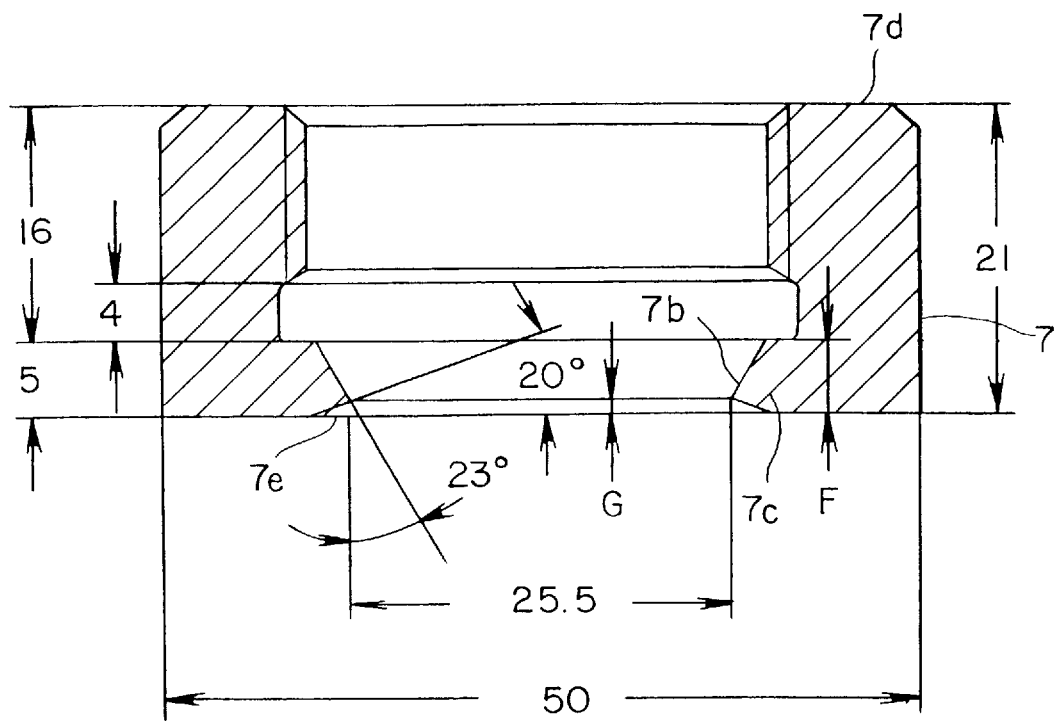

FIG. 3 shows a known flange in a 2:1 scale (all data in millimeters) with a beveled surface 7b for the flush front installation of a pressure measurement device for a measurement range of 0.1–25 bar. The thickness of the sealing rib 7c is 5 mm; in the region of the beveled surface 7b it is approx. 4 mm. It has a phase 7e. The great thickness of the sealing rib 7c is necessary since great forces can arise when screwing in the pressure measurement device.

The sealing bevel of the pressure measurement device is disposed parallel to the beveled surface 7b of the flange 7.

Figure 5:
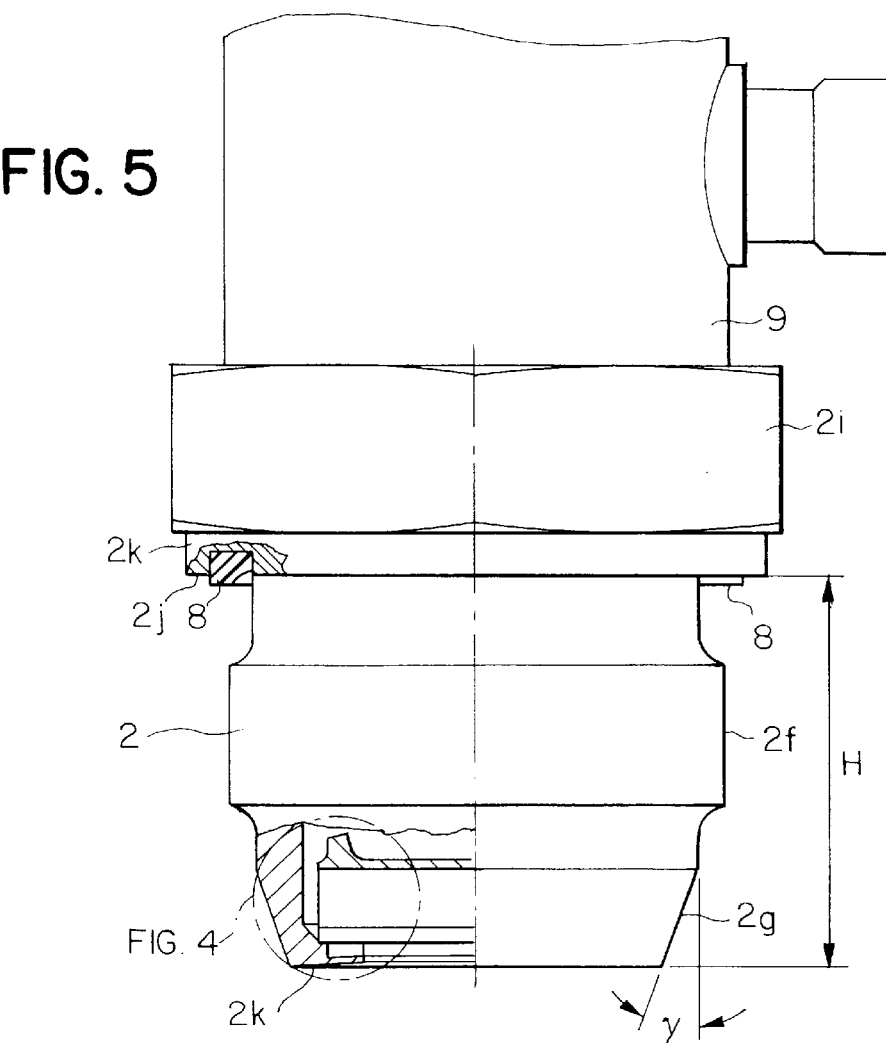
FIG. 5 shows a pressure measurement device according to the invention
Figure 6:
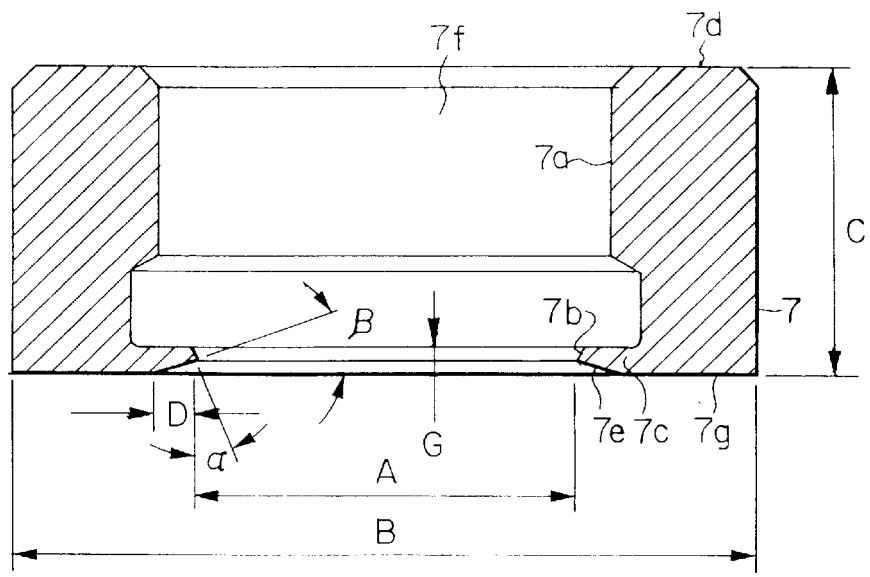
FIG. 6 is a longitudinal sectional representation of a flange according to the invention

FIGS. 5 and 6 each show an example for a pressure measurement device with sealing bevel 2g, hex nut 2i, and thread 2f, and a flange 7 with a spring-elastic sealing rib 7c and beveled surface 7b according to the invention. Beveled surface 7b may be formed at an angle Alpha, e.g., 15° to 35° and bevel 2g may be formed at an angle Gamma, e.g., 0.75° to 8° greater than angle Alpha. More specifically, Gamma may be, e.g., between 1° and 7°, and preferably 3° greater than Alpha. For example, the angle Gamma of sealing bevel 2g is 23°, the angle Alpha of sealing bevel 7b is 20°. Flange 7 may include inner threads 7a which may be coupled with outer threads 2f of pressure measurement device 9 to properly mount pressure measurement device 9 in flange 7. When the pressure measurement device 9 is screwed into the flange, the sealing bevel 2g and beveled surface 7b meet each other at a relatively small, acute angle of 3°. The screw-in depth is defined by the underside 2j of the projection 2k, which rests on the upper side 7d of flange 7. Among other things, this has the advantage that no expensive torque wrench has to be used; a simple open-jawed wrench, for example, is sufficient for screwing it in by means of the hex nut 2i. Even when excessive screwing forces are exerted on the hex nut 2i (e.g. by unqualified personnel), it is assured that the force in the region of the sealing bevels lies within a predetermined tolerance range. It is important that the dimensions A, C, and H and the angles Alpha, Beta, and Gamma are maintained in a sufficiently precise manner. Preferably, the sealing rib has a phase 7e, whose angle Beta is 5°–17°.

In some cases, a second seal 8 can be affixed to the underside of the projection 2k.

Reference Numeral List 1 support ring
1a thread
2 housing
2a end face part of the housing
2b elastic sealing rib
2c elastic sealing rib nose
2d inner chamber
2e groove
2f external thread
2g sealing bevel
2h internal thread
2i hex nut
2j underside
2k projection
3 pressure measuring cell
3a base body
3b spacer
3c membrane
3d second main face
3e first main face
3f inner chamber
3g outside
4 seal
4a edge toward the medium
5 dead space
6 seal
7 flange
7a internal thread
7b beveled surface
7c sealing rib
7d upper end
7e phase
7f through opening
7g underside
8 seal
9 pressure measurement device
A–H dimensions
α-Γ angles

We claim:

1. A pressure measurement device for measuring the pressure of a pressure medium, comprising:
   a housing having spring-elastic properties, the housing forming an inner chamber;
   a seal disposed adjacent the inner chamber of the housing, the seal being capable of being between the inner chamber of the housing and the pressure medium; and
   a pressure measuring cell disposed in the housing, the pressure measuring cell having a main face which is capable of being exposed to the pressure medium, the pressure measuring cell having a deflection when loaded, which deflection leads to a relative movement between the pressure measuring cell and the housing in a region of the seal.

2. The pressure measurement device of claim 1, wherein the housing comprises an elastic sealing rib.

3. The pressure measurement device of claim 2, wherein the elastic sealing rib has a groove for receiving the seal.

4. The pressure measurement device of claim 1, wherein the seal has a substantially rectangular cross-section.

5. The pressure measurement device of claim 1, wherein the seal comprises an edge capable of being disposed adjacent to the pressure medium, and wherein the housing comprises an elastic sealing rib having a nose, and wherein the edge of the seal and the nose of the elastic sealing rib are shaped to minimize dead space.

6. The pressure measurement device of claim 3, wherein the main face of the pressure measuring cell comprises an edge region, and wherein the seal is disposed in a region of the edge region of the main face of the pressure measuring cell.

7. The pressure measurement device of claim 1, wherein the seal is electrically non-conductive.

8. The pressure measurement device of claim 1, wherein the seal comprises thermoplastic.

9. The pressure measurement device of claim 1, wherein the seal is slightly rubber elastic.

10. The pressure measurement device of claim 1, wherein the seal is not at all rubber elastic.

11. The pressure measurement device of claim 1, wherein the seal has cold flow properties.

12. The pressure measurement device of claim 1, wherein the seal comprises polytetrafluoroethylene.

13. The pressure measurement device of claim 1, wherein the seal consists of polytetrafluoroethylene.

14. The pressure measurement device of claim 1, wherein the seal comprises an ethylene tetrafluoroethylene copolymer.

15. The pressure measurement device of claim 1, wherein the seal comprises pefluoroalkoxy copolymer.

16. The pressure measurement device of claim 1, wherein in a region of the pressure measuring cell, the housing has a rotationally symmetrical shape.

17. The pressure measurement device of claim 1, wherein the pressure measuring cell has a rotationally symmetrical shape.

18. The pressure measurement device of claim 1, wherein the pressure measuring cell is a capacitively functioning pressure measuring cell which is comprised of a membrane, a base body, a spacer, and electrodes disposed in an inner chamber formed by the membrane and base body, which electrodes are disposed on the membrane and the base body.

19. The pressure measurement device of claim 2, wherein the housing, the pressure measuring cell, and the seal are embodied and disposed so that a force with which the seal is pressed against the elastic sealing rib in a pressure-free state can be adjusted.

20. The pressure measurement device of claim 19, wherein the force with which the seal is pressed against the elastic sealing rib in a pressure-free state can be adjusted by a support ring adjacent to the pressure measuring cell.

21. The pressure measurement device of claim 3, wherein a depth of the groove is at its least in a region of an edge of the seal capable of being disposed toward the pressure medium.

22. The pressure measurement device of claim 1, wherein a thickness of the seal is at its greatest in a region of an edge of the seal capable of being disposed toward the pressure medium.

23. The pressure measurement device of claim 1, wherein the pressure measuring cell comprises a membrane, and wherein thermal expansion coefficients of the pressure measuring cell membrane and the housing are different in a region of the seal.

24. The pressure measurement device of claim 1, wherein the pressure measuring cell comprises a membrane, and wherein the pressure measuring cell membrane comprises an electrically non-conducting material.

25. The pressure measurement device of claim 1, wherein the pressure measuring cell comprises a membrane, and wherein the pressure measuring cell membrane comprises ceramic.

26. The pressure measurement device of claim 1, wherein the pressure measuring cell comprises a membrane, and wherein the pressure measuring cell membrane has a rectangular cross section.

27. The pressure measurement device of claim 1, wherein the housing comprises a member selected from the group consisting of metal and metal alloy.

28. The pressure measurement device of claim 1, wherein an end face part of the housing comprises stainless steel.

29. The pressure measurement device of claim 28, wherein the stainless steel comprises V4A stainless steel.

30. The pressure measurement device of claim 1, wherein an end face part of the housing is embodied as two parts.

31. The pressure measurement device of claim 1, further comprising a flush front.

* * * * *